United States Patent [19]
Schultz et al.

[11] Patent Number: 6,100,487
[45] Date of Patent: Aug. 8, 2000

[54] CHEMICAL TREATMENT OF ALUMINUM ALLOYS TO ENABLE ALLOY SEPARATION

[75] Inventors: Paul B. Schultz, Export; Rebecca K. Wyss, Murrysville, both of Pa.

[73] Assignee: Aluminum Company of America, Pittsburgh, Pa.

[21] Appl. No.: 09/025,978

[22] Filed: Feb. 19, 1998

Related U.S. Application Data

[60] Provisional application No. 60/038,968, Feb. 24, 1997.

[51] Int. Cl.⁷ .................................................. B07C 5/342
[52] U.S. Cl. ............................................................ 209/580
[58] Field of Search ............................................... 209/580

[56] References Cited

U.S. PATENT DOCUMENTS

| | | | |
|---|---|---|---|
| 3,712,469 | 1/1973 | Dwyer et al. | 209/580 X |
| 4,317,521 | 3/1982 | Clark et al. | 209/558 |
| 4,330,090 | 5/1982 | Montagna et al. | 241/14 |
| 5,085,325 | 2/1992 | Jones et al. | 209/580 |
| 5,111,927 | 5/1992 | Schulze | 209/644 X |
| 5,520,290 | 5/1996 | Kumar et al. | 209/580 |
| 5,538,142 | 7/1996 | Davis et al. | 209/580 |

OTHER PUBLICATIONS

Separation of Cast And Wrought Alloys For Recycling Aluminum Automotive Shredder Scrap, Rebecca K. Wyss, Gerald E. Carkin, Leroy E. D'Astolfo—Interior, Safety & Environment IBEC '97.

Sorting Techniques for Mixed Metal Scrap—R. D. Brown, Jr., W. D. Riley, and D. M. Soboroff—*Conservation & Recycling*, vol. 9, No. 1, pp. 73–86, 1986.

Hot–Crush Technique for Separation of Cast– And Wrought–Aluminum Alloy Scrap, Fred Ambrose, R.D. Brown Jr., Dominic Montagna, and H.V. Makar—*Conservation & Recycling*, vol. 6, No. 1/2, pp. 63–69, 1983.

Separation of Cast And Wrought Aluminum Alloys By Thermomechanical Processing, R.D. Brown Jr., F. Ambrose, and D. Montagna—RI 8960, Bureau of Mines Report of Investigation/1985.

*Primary Examiner*—Christopher P. Ellis
*Assistant Examiner*—Joe Dillon, Jr.
*Attorney, Agent, or Firm*—Charles Q. Buckwalter

[57] ABSTRACT

The present invention is directed to a method employing wet chemistry techniques of treating wrought aluminum alloys in order to quickly and efficiently separate the alloys into their alloy families and major constituent members by separation by surface color of the treated alloys.

22 Claims, 5 Drawing Sheets

2XXX
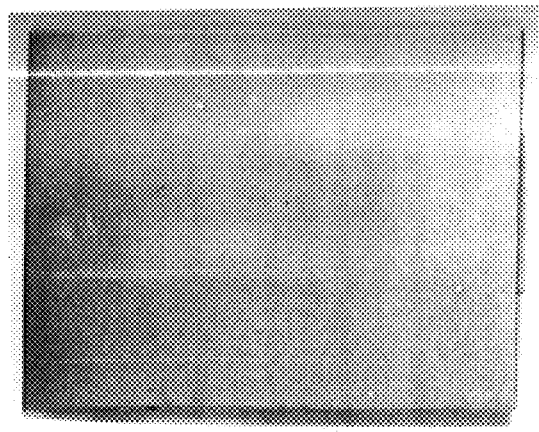
6XXX
7XXX
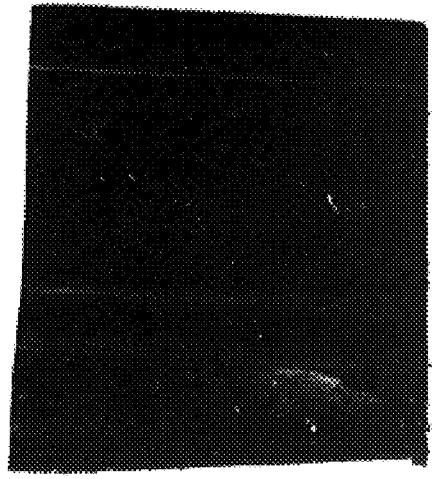
FIG. 1

2XXX
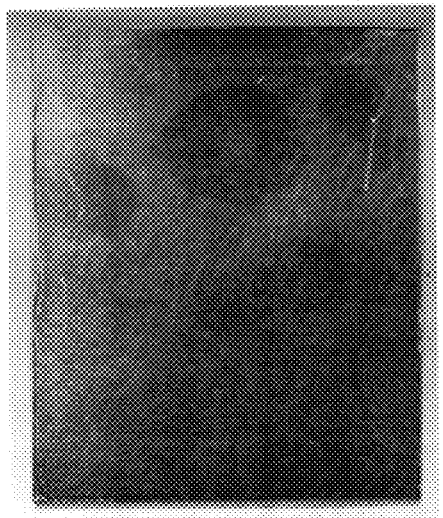
6XXX
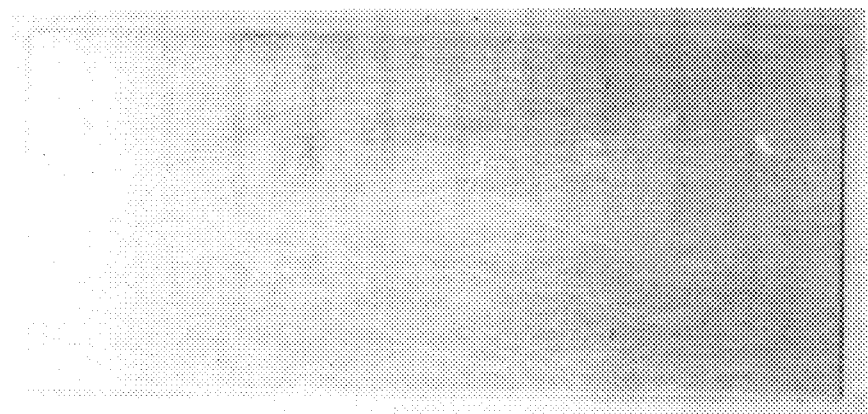
7XXX
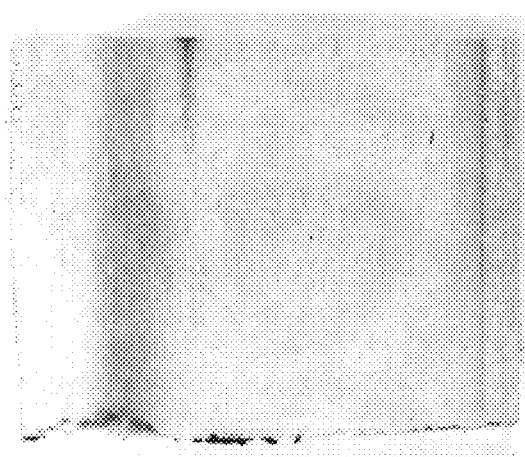
FIG. 2

CHEMICAL TREATMENT OF ALUMINUM ALLOYS TO ENABLE ALLOY SEPARATION

CROSS REFERENCE TO RELATED APPLICATIONS

This application claims the benefit of U.S. Provisional Application Ser. No. 60/038,968, filed Feb. 24, 1997.

The present invention is directed to a method of treating different aluminum alloys, for example The Aluminum Association registered alloys, that may enter the scrap stream, with chemical treatments to enable a system capable of rapid, non-contact, separability between the alloy families and/or their constituent members in order to economically recycle worked aluminum alloy.

Those skilled in the aluminum alloy art will appreciate the difficulties in this art of separating aluminum alloys, especially alloys that have been worked such as forged, extruded, rolled, generally wrought alloys, into a reusable or recyclable worked product. These alloys for the most part are indistinguishable upon visual inspection or by other conventional scrap sorting techniques such as density and/or eddy currents. Therefore, it is a difficult task to separate for example, 2xxx, 3xxx, 5xxx, 6xxx, and 7xxx series alloys. To recycle aluminum alloys economically and maintain the integrity of the as-made alloy, each series can be separated into its series family or it may also be separated into like constituent alloys. For example, the alloy families as determined by their Aluminum Association definitions have overlapping constituent concentrations. When similarly constituted alloys are mixed, their separation into their family groups may not be feasible, but grouping according to constituent mix instead of family series is a useful exercise in recycling worked product as well. As used herein, the terms "worked" and "wrought" are interchangeable, their meaning defined by putting energy into the alloy by forging, extruding, rolling, heat treating, or any other means of working the alloy.

There are more and more wrought aluminum alloys being used, particularly in the manufacture of vehicles such as automobiles and trucks. In order for this manufacturing use to mature, it is considered important to have a recycling schema developed consistent with the so-called "green" or environmentally sensitive movement in industry. It is projected that in order to participate in the supply of material to the automobile manufacturing companies, especially those in Europe, more than 90% of the material used in the manufacture of cars must be recycle friendly. Accordingly, for the aluminum industry to participate in and expand their supply of aluminum to the automotive industry, an initiative to close the circle of life for aluminum alloys is overdue.

The mixed alloy scrap presents some difficult problems to resolve. Mixed alloy scrap has poor absorption into high quality wrought alloys, and as a result, only limited amounts of mixed scrap can be used for recycling into wrought products. Absorption is defined as the percentage of an alloy or mixture that can be used to produce an ingot of another desired composition without exceeding the specified alloy composition limits. There are compelling reasons to resolve this problem since as the use of aluminum alloy increases the supply/demand curve pressures increase. It is likely that the use of wrought alloys will grow at a faster pace than aluminum alloy castings. Wrought or worked aluminum alloys combined with cast aluminum alloys are not normally recycled into wrought compositions in the art as it is known today. It is generally desirable to maintain a wrought composition as wrought since that is a higher valued product.

The problem to be solved by the present invention is the separation of wrought alloys into their different families and/or their major constituent groups. Without a solution to this problem, there may be a growing scrap pile of both mixed wrought and cast aluminum alloys or just a mixed pile of wrought alloys that are unable to be economically converted into useable wrought aluminum alloys. The growing pile of wrought alloys will be comprised of a cornucopia of mixed family wrought alloys and mixed constituents, as for example stated above, the 2xxx, 3xxx, 4xxx, 5xxx, 6xxx, 7xxx and/or 8xxx series alloys as defined by the Aluminum Association. This growing pile then must be subjected to a separation technique or techniques that are efficient and simple, elsewise, the aluminum incursion into alternative manufacture schemes in the vehicular trade will see limited growth.

There are certain economies available to the aluminum industry by developing a well-planned yet simple recycling plan or system. The use of recycled material will be a less expensive metal resource than a primary source of aluminum. As the amount of aluminum sold to the automotive industry increases, it will become increasingly necessary to use recycled aluminum to supplement the availability of primary aluminum. Primary aluminum is defined as aluminum originating from aluminum-enriched ore, such as bauxite.

As stated above, wrought scrap contains a mixture of wrought alloys. The mixed wrought scrap has limited value because the mixture, due to its combined chemical composition, must be diluted if used to produce a new wrought alloy. The reason this is so is due to the more stringent compositional tolerances of wrought alloys which are required to meet the performance requirements of wrought products. Ideally, the high value scrap should have a high absorption back into the recycled product. High absorption means that a substantial portion of the final product is comprised of scrap. To increase the value of the wrought scrap requires the separation of wrought product into alloy grades or similar constituted materials to maximize absorption.

Mixed alloy scrap presents some difficult problems in separability due to its poor absorption into high quality wrought alloys. The Table shows the limits to absorption and the limiting element of, by way of example, automotive shredder scrap in a variety of castings and wrought alloys. The absorption of mixed scrap consisting of both castings and wrought alloys, a mixture of wrought alloys and a mixture of cast alloys which have been separated from the parent mixture of shredder scrap is represented in the Table. This shows that casting alloys 380 and 384 can absorb large quantities of scrap. Also shown is that the absorption of any of these scrap mixes in the wrought alloys is low. The mixture of wrought alloys separated from the shredder scrap has limited absorption back into wrought products. To increase the absorption of scrap back into wrought products the wrought mixture must be further sorted according to the constituent make-up.

|  | Casting Alloys | | | Wrought Alloys | | |
| --- | --- | --- | --- | --- | --- | --- |
|  | 356 | 380 | 384 | 5754 | 6111 | 7003 |
| Mixed Scrap | 15 Cu | 64 Cu | 100 | 6 Si, Cu | 15 Si, Cu | 4 Si |
| Wrought | 32 Cu | 100 | 100 | 13 Cu | 12 Zn | 26 Cu |
| Cast | 9 Cu | 41 Cu | 75 Fe | 4 Si, Fe | 8 Si, Fe | 2 Si |

Mixed aluminum wrought alloy product cannot be separated using traditional processes like sink-float or eddy current. The elements listed in the Table indicate the element that limits absorption. The numbers represent the limit in weight percent by which the scrap can be absorbed.

It has been demonstrated that wrought alloys have definite and different responses to surface chemical treatments dependent upon their resident major constituents. Aluminum, of course, will always be the bulk of the material, however, constituents such as copper, magnesium, silicon, iron, chromium, zinc, manganese, and other alloying elements provide a range of properties to alloyed aluminum and provide a means to distinguish one wrought alloy from the other. These before referenced chemical treatments can produce distinct and different colors on the surfaces of different wrought aluminum alloys. Accordingly, the present invention is directed to a means to separate scrap wrought aluminum alloys according to families or major constituent members using the color of the treated scrap as the separation variable. The usefulness of such a separation technique is apparent since such a technique would be very convenient and efficient as part of a system of recycling aluminum since sorting should increase the absorption of scrap into the remanufacture of new products. Such a system would be useful for the aerospace and/or automotive industry or any industry where recycling aluminum is an important component of the business.

SUMMARY OF THE INVENTION

In the practice of the present invention the use of an etchant, such as a caustic, an acid, an oxidizing agent, a dye, and/or some combination thereof, within a single or plurality of steps using wet chemistry treatment of the surfaces of mixed wrought aluminum alloys which changes the color of the surface of the alloys makes them distinguishable on the basis of alloy families or major constituent members thereby creating a system for the separation of mixed wrought aluminum alloys into related groups. The interaction of these various treatments on the surfaces of the different series aluminum alloys is related to and dependent upon the chemistries of the alloys and the constituent make-up.

While the inventors hereof do not wish to be held to any particular theory of interaction, it is believed that dependent upon the chemistry applied, such treatment causes any one of the following. It causes an insoluble precipitate to form on the surface of the metal alloy such as a silver nitrate treatment, some kind of complexation occurs, there is compound formation, causes insoluble constituents to remain on the surface, and/or a dye can be adsorbed. This reaction is then treatment and alloy specific, which is the genesis for the solution to this problem. For the purposes of the invention hereof, the importance of the identification of any particular chemical reaction is at best secondary. The primary reaction of interest is simply to change a surface characteristic and/or surface appearance sufficiently and consistently to be able to separate the alloy series into their appropriate family members or major constituent members. In so doing, the thusly separated alloys may be conveniently reunited with alloys of like or the same composition to be recycled into a wrought product. Once so separated, the once formed unitary scrap may be recycled to produce a supply source of wrought aluminum that may re-enter the aluminum life cycle in a higher value added form.

The caustic of choice is a solution of sodium hydroxide. Importantly, any caustic with a sufficiently high dissociation constant to enable the hydroxide ions or ions of similar activity to interact with the transition metals which comprise the different aluminum alloys to cause color variations between the different alloy families is hereof a part of this invention. It is not simply the coloring of aluminum alloys that is the subject of this invention, it is the coloring and subsequent differentiation into alloy family and constituent members. Concentration ranges of sodium hydroxide may be from 0.001 molar sodium hydroxide to up to a saturated sodium hydroxide solution. It is preferred, in keeping with the green concept, that the more dilute caustic is used. Additionally, the application of heat will affect the quickness of the color reaction kinetics. The trade-off between heat, reaction time and concentration of reactants is common to chemical reactions, and this particular etching of the alloy is no exception.

Other hydroxides, such as potassium, lithium, and any of the alkali metal hydroxides would make a suitable caustic, limited by the cost and green effect of the caustic. Other bases, such as borate combinations, that dissociate to provide an equivalently active etch of metals as the above cited range of sodium hydroxide can provide a suitable mechanism for creating a colorant.

Common acids used as etchants also vary the surface characteristic and/or appearance of the alloy. Some readily available examples of acids are comprised of sulfuric, phosphoric, and hydrochloric acids, the composition range is from 0.001 N to saturation and comprise combinations thereof. While it is not preferred, organic metal etchants could be employed, such as trichloroacetic acid.

A part of the process of separation is a multi-stepped treatment where alloy samples are first treated with a caustic and then treated with an acid etchant. In this manner, those alloys which can not be distinguished by one treatment may be separated by an additional or plurality of treatments.

When incorporated into a system of recycling for wrought aluminum products, optional treatments may be employed. These treatments relate to the kinetics or the reaction mechanism required to change the color of the surface of the alloy. For example, first envisioned in a system of recycling is the collection of shredded aluminum alloy scrap. At this point in the alloy's life cycle, it is probably coated with either paint or some lacquer coating as it was employed as a decorative or protective coating for the car-bound aluminum. Some of the lacquered or painted coating may have delaminated providing exposed alloy surfaces. That exposure while sufficient to react with the etchant may not be as efficient as a piece of bare alloy. Therefore, a more active optional delamination or delacquering treatment of the coating may be introduced as another step in recycling, for efficiency purposes. Importantly, exposed alloy surfaces are needed to interact with the etchant. The surface-to-volume ratio of alloy to etchant need not be extensive; only enough alloy needs to be exposed to react with the etchant to distinguish one alloy family or constituent members from another.

In the recycling system envisioned with the present invention, distinguishing one alloy from another may involve a simple visual and, therefore, labor intensive exercise. However, there are many "off-the-shelf" color sensitive separation devices that could be employed once the means to separate the alloys is effected to enhance the economics of the system.

A system for color sorting of different aluminum alloys comprises the steps of optionally shredding and/or delacquering the aluminum alloy and/or separating from castings alloys, treating the shredded aluminum, and detecting and separating the alloy families and constituent members on the basis of color or some other detectable characteristic such as oxide thickness. Once separated, the family or constituent members may be appropriately joined, re-manufactured and re-entered into the wrought aluminum supply stream.

The method of treating the alloy can be done by any method whereby the sample is treated with the reagent and subsequently rinsed and then optionally dried. For example, the scrap is placed in a suitable containing means, treated with an appropriate treatment agent, after reaction the treatment agent may be rinsed, the alloys may then be separated by color or shades of lightness and darkness thereof. Drying may be by simple air dry or by some heating means. The treatment agent may be applied at room temperature or at elevated temperatures. The treatment agent may be a solution that the samples are dipped into or may be sprayed or applied as a liquid by any liquid application means. Having said that, it is preferred to have a controlled process to insure that environmental factors are considered, thus not defeating the intent of this system of separating wrought alloys for "greening" the environment. It was found and it is therefore preferred that surface reactions were much more responsive to cleaned and exposed aluminum alloy surfaces than for example lacquered or dirty surfaces.

In the alternative, castings may also be color sorted by the same system. It is, however, advantageous and therefore preferred to separate the castings from the wrought products. This may be done visually but it is preferred to separate castings from wrought products by a thermomechanical means such as hot crushing. This thereby facilitates the subsequent separation of castings into the aluminum alloy series such as the 1xx.x, 2xx.x, 3xx.x, 4xx.x, 5xx.x, 7xx.x, 8xx.x and/or constituent members disclosed hereunder when such series or members are cast alloys. The separation techniques are substantially the same as disclosed for the wrought products.

BRIEF DESCRIPTION OF THE FIGURES

FIG. 1 is an optical photograph of three sample aluminum alloys exhibiting varying degrees of color after treatment with a caustic etchant.

FIG. 2 is an optical photograph of three sample aluminum alloys exhibiting varying degrees of color after treatment with an acid etchant.

DETAILED DESCRIPTION

The following is intended to further teach the invention hereof and is not intended to limit the scope of the invention hereof.

EXAMPLE 1

Alloy samples of Aluminum Association registered aluminum alloys 2036, 6022, and 7003 were subjected to caustic treatment by 1.2 M NaOH etch at 155° F. for 45 seconds. The results of this etch are shown in FIG. 1, the 2xxx series is the top sample, the 6xxx series is the middle sample, and the 7xxx series is the bottom sample. For each treatment of each family of alloy, a different color and/or shade evinces. Each family can then be separated into its family lot.

EXAMPLE 2

Alloy samples of 2036, 6022, and 7003 were also subjected to an acid etch treatment using a combined solution of 4% $H_3PO_4$ and 6% $H_2SO_4$ at 190° F. for 3 minutes. The results of this etch are shown in FIG. 2, the 2xxx series is the top sample, the 6xxx series is the middle sample, and the 7xxx series is the bottom sample. As in the caustic etch, the acid etch also indicates that these alloys can be separated calorimetrically.

EXAMPLE 3

Figure 3:
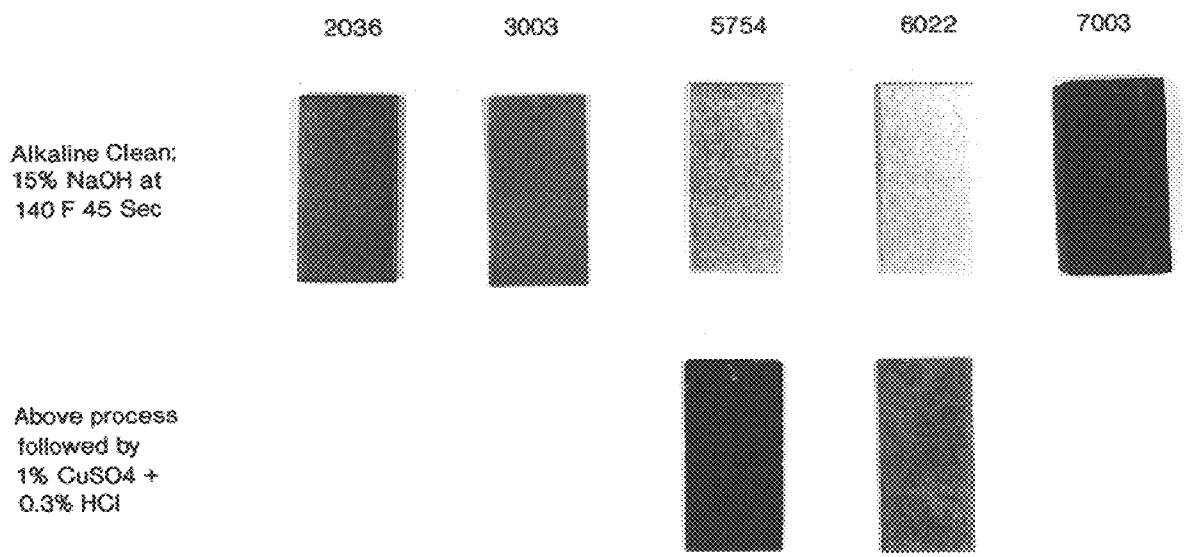
FIG. 3 is an optical photograph of 7 samples from 5 different alloy families exhibiting varying degrees of color after a two step treatment.

Alloy samples of 2036, 3003, 5754, 6022, and 7003, as displayed in FIG. 3, were treated with 15% sodium hydroxide at 140° F. for 45 seconds. FIG. 3 exhibits the varying colors of these alloys from the caustic treatment, thereby making 2036, 3003, 7003, separable from each other and from the 5754 and 6022 samples. The latter samples were not readily separable visually, but may be separable by the use of optical sensors under appropriate lighting conditions. Therefore a second treatment was made on these two samples using 1% copper sulfate mixed in 0.1% hydrochloric acid. FIG. 3 indicates an HCl concentration of 0.3% by volume which is substantially similar to the 0.1% disclosed in this Example 3. As shown in FIG. 3, this second treatment makes it possible to then readily separate the 5754 sample from the 6022 sample.

EXAMPLE 4

Figure 4:
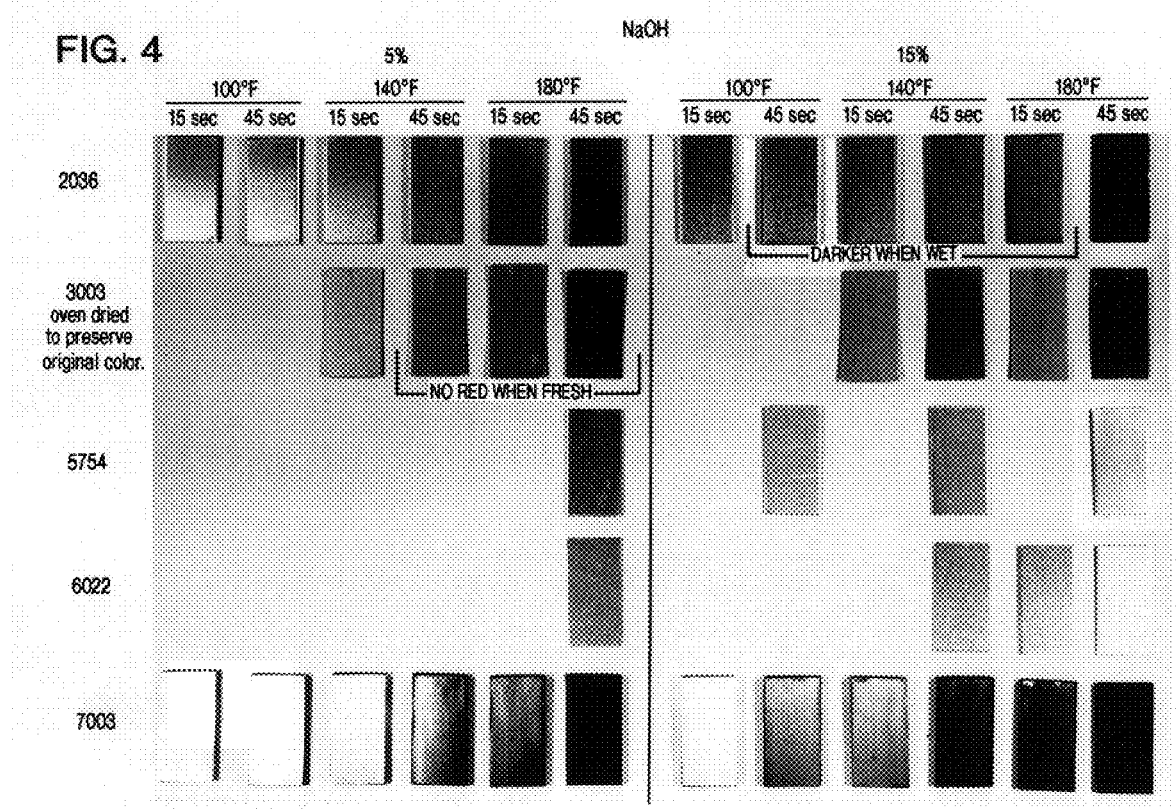
FIG. 4 is an optical photograph of samples treated at different temperatures and concentrations of caustic exhibiting varying degrees of color.

With reference to FIG. 4, this figure exhibits 36 samples from 5 different alloy families that were treated by two different concentrations of sodium hydroxide etchant and three different temperatures. The sodium hydroxide concentrations were varied between 5% and 15% by weight. The temperatures were varied within both concentrations at 100° F., 140° F., and 180° F. for 2036 and 7003. The 3003 alloy was treated at two different temperatures and the 5754 and 6022 were treated at one temperature at the 5% sodium hydroxide concentration. 5754 was treated at all three temperatures at the 15% sodium hydroxide temperature, and the 6022 was treated at the two higher temperatures at the 15% sodium hydroxide concentrations. It is noted that as the temperature was increased and sodium hydroxide concentration was increased, the etchant became more active towards the 2036, 3003, and 7003 alloys. The sodium hydroxide had little effect upon the 5754 and 6002 alloys. The samples can be separated whether wet, dried, or oven dried. The effect of drying is to change the color or color intensity but drying does not affect the sortability. The colors in FIG. 4 are from samples that have been aged at room temperature for several weeks. It is preferred to rinse the samples immediately after etching with a caustic.

EXAMPLE 5

Figure 5:
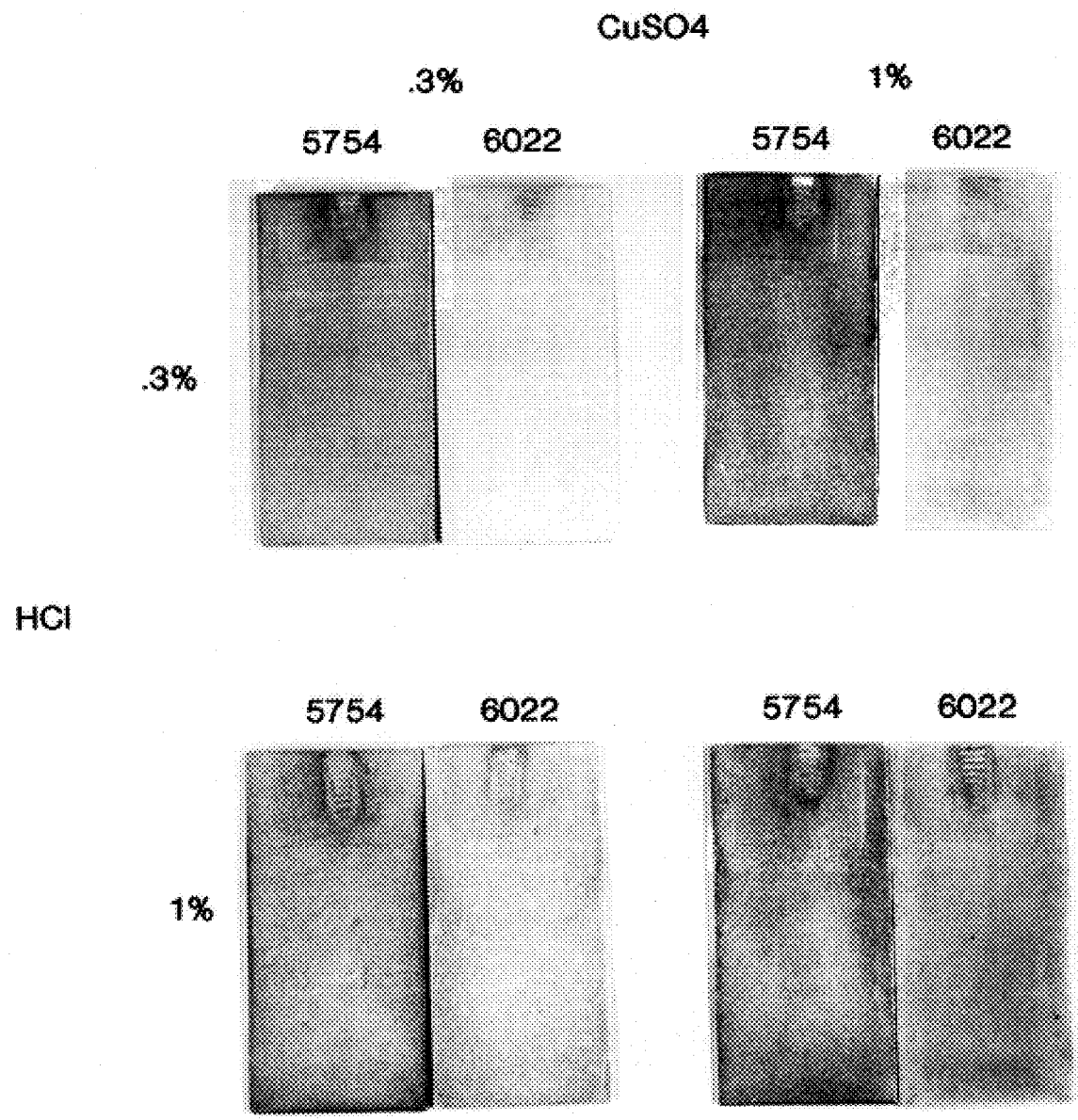
FIG. 5 is an optical photograph of samples treated at different concentrations of an acid etchant.

With reference to FIG. 5, the figure shows the caustic resilient 5754 and 6002 samples after treatment with an acid solution at room temperature. Hydrochloric acid and copper sulfate concentrations were varied in a matrix of 0.1% and 1%, respectively. While it is noted that the 1% and 1% treatment appears most active, it did not distinguish the two alloy samples as well as the lower concentration of hydrochloric acid.

The dye quinalizarin proved effective in separating the magnesium containing alloys. As those skilled in this art can appreciate, chelating molecules that are specific for certain of the transition metals would be useful in complexing with those certain metals and therefore a useful separation agent for the purpose in this system.

It was found that immersion in acetic acid, which is recommended in *Recycled Metals Identification & Testing Handbook*, National Association of Recycling Industries, NY, N.Y. to distinguish 5xxx series alloys failed to effect any difference in color. In addition, it was thought that since molybdate turns yellow in the presence of silicate and there is a silicon difference between 5xxx alloys and 6xxx alloys that immersion in molybdate solutions would distinguish these two alloys, but this test failed as well.

We claim:

1. A wrought aluminum alloy separation method wherein said method comprises the application of chemical agents to wrought aluminum alloy family series and major constituent members of wrought aluminum alloys thereby providing for separation by surface color and separating said family series and constituent members by color.

2. The method of claim 1 wherein said wrought aluminum alloy is selected from the group consisting of 2xxx, 3xxx, 4xxx, 5xxx, 6xxx, 7xxx, 8xxx, and some combination thereof.

3. The method of claim 1 wherein said wrought aluminum alloy family series and major constituent members are scrap aluminum alloy.

4. The method of claim 1 wherein said wrought aluminum alloy family series and major constituent members are recycled as wrought aluminum alloy.

5. The method of claim 1 wherein said method comprises a treatment selected from the group consisting of caustic, acid, oxidizing agents, dyes, and some combination thereof.

6. The method of claim 1 wherein said method comprises major constituents selected from the group consisting of magnesium, silicon, iron, chromium, zinc, copper, manganese, and some combination thereof.

7. The method of claim 1 wherein said method increases the percentage of absorption of wrought aluminum alloy into remanufactured wrought aluminum alloy.

8. The method of claim 1 wherein said method comprises a treatment with hydroxide.

9. The method of claim 1 wherein said method comprises a treatment with sodium hydroxide from about 0.001 molar to a saturated solution of sodium hydroxide.

10. The method of claim 1 wherein said method comprises a treatment with an acid selected from the group consisting of sulfuric, phosphoric, and hydrochloric acids in concentration from about 0.001 N to saturation.

11. The method of claim 1 wherein said wrought aluminum alloy is delacquered.

12. The method of claim 1 wherein said wrought aluminum alloy is delaminated.

13. The method of claim 1 wherein said method of separation comprises an optical sensor.

14. The method of claim 1 wherein said method comprising a means for heating.

15. The method of claim 1 wherein said wrought aluminum alloy is selected from the group consisting of Aluminum Association series 2036, 6022, 7003, 5754, 3003, and some combination thereof.

16. The method of claim 1 wherein said method comprises a treatment of said alloys with copper sulfate.

17. The method of claim 1 wherein said method comprises a treatment of said alloys with wet chemistry separation technique.

18. The method of claim 1 wherein said method comprises a single or a plurality of wet chemistry treatments.

19. The method of claim 1 wherein said surface color is from oxide thickness.

20. The method of claim 1 wherein a dye is adsorbed on said wrought aluminum alloy.

21. An aluminum alloy separation method wherein said method applies chemical treatment to cast aluminum alloy family series and major constituent members separates said cast aluminum alloy family series and major constituent members of aluminum alloys by sorting by surface color of the chemically treated surfaces.

22. The method of claim 21 wherein said cast aluminum alloys are selected from the group consisting of 1xx.x, 2xx.x, 3xx.x, 4xx.x, 5xx.x, 7xx.x, 8xx.x, and combinations thereof.

* * * * *